United States Patent
Nakamura et al.

(10) Patent No.: US 6,198,981 B1
(45) Date of Patent: Mar. 6, 2001

(54) CONTROL APPARATUS (75) Inventors: Tsuyoshi Nakamura, Tama; Atsushi Umeshima, Tokyo, both of (JP)

(73) Assignee: Tokyo Electron Limited, Tokyo (JP)

( * ) Notice: Subject to any disclaimer, the term of this patent is extended or adjusted under 35 U.S.C. 154(b) by 0 days.

(21) Appl. No.: 09/001,996

(22) Filed: Dec. 31, 1997

(30) Foreign Application Priority Data

Jan. 7, 1997 (JP) ................................................. 9-000832

(51) Int. Cl.[7] ...................................................... G06F 19/00
(52) U.S. Cl. .............................. 700/121; 700/3; 709/211
(58) Field of Search .................................... 709/211, 208; 700/121, 3; 702/185

(56) References Cited

U.S. PATENT DOCUMENTS

| 5,432,715 | * | 7/1995 | Shigematsu et al. | 702/188 |
| 5,495,417 | * | 2/1996 | Fuduka et al. | 700/121 |
| 5,687,085 | * | 11/1997 | Morimoto et al. | 700/121 |
| 5,754,780 | * | 5/1998 | Asakawa et al. | 709/208 |
| 5,980,591 | * | 11/1999 | Akimoto et al. | 29/25.01 |

FOREIGN PATENT DOCUMENTS 2-577747   11/1996   (JP) .

* cited by examiner

Primary Examiner—William Grant
Assistant Examiner—Paul Rodriguez
(74) Attorney, Agent, or Firm—Oblon, Spivak, McClelland, Maier & Neustadt, P.C.

(57) ABSTRACT

A control apparatus comprises at least one slave control units for subjecting a specific control to the corresponding processing unit in a processing system, a master control unit for supervising the slave control unit, and a bus for controlling the slave control units to the master control unit. The master control unit includes a log file for storing the contents of the control of the master control unit and the slave control unit, an abort factor log file for storing the factors aborting the control of the master control unit and the slave control unit, and a display section for displaying the control-abort factors stored in the abort factor log file.

27 Claims, 8 Drawing Sheets

CONTROL APPARATUS

BACKGROUND OF THE INVENTION

This invention relates to a control apparatus for controlling, for example, equipment for manufacturing semiconductor devices.

In the photolithography process in the manufacture of semiconductor devices, after the photoresist coating process of forming a photoresist film on the surface of a semiconductor wafer (hereinafter, referred to as a wafer) and the exposure process of exposing the resist-coated wafer have been carried out, the development process of developing the exposed wafer is performed. The photoresist coating process and the development process are carried out according to a specific sequence in a complex processing system constructed by various processing units, as disclosed in, for example, Jpn. Pat. Appln. KOKOKU Publication No. 2-30194.

In sequence control in such a system, software bugs or hardware problems can cause the system to go down. Should this happen, it is necessary to investigate the causes of the malfunction. Jpn. Pat. Appln. KOKAI Publication No. 5-324053 has disclosed the technique for causing a data collector to constantly acquire the data from a sequence controller and, when a failure has occurred in an automatic machine, displaying the acquired data covering a certain point in time to the time when the failure occurred on a data history display. This enables the operator to learn the cause of the malfunction from the displayed acquired data.

In ordinary sequence control, the volume of the acquired data is often enormous. In a complex processing system including the aforementioned processing units, various types of control are performed and therefore the volume of the acquired data is tremendous. Accordingly, it is very difficult to find out the cause of the malfunction from the displayed acquired data.

To overcome this problem, for example, Jpn. Pat. Appln. KOKAI Publication No. 5-324053 has disclosed the technique for storing the normal data beforehand in the system and extracting the cause of the malfunction by comparing the normal data with the acquired data.

The volume of the normal data increases as the volume of the acquire data increases and therefore the former is often enormous. As a result, particularly in the case of the complex processing system, the following problem arises: storing such an enormous amount of normal data requires memory means with a tremendous memory capacity.

BRIEF SUMMARY OF THE INVENTION

An object of the present invention is to provide a control apparatus capable of narrowing down the abnormal factors without increasing the memory capacity so much.

Another object of the present invention is to provide a control apparatus capable of letting the operator to know the abnormal factor no matter where it has occurred.

According to the present invention, there is provided a control apparatus comprising at least one slave controller for performing a specific control to a processing unit corresponding to the slave controller in a processing system, a master controller for supervising the slave controller, and a bus connected to the slave controller to the master controller, wherein the master controller includes a first storage section that stores the contents of the control of the master controller and the slave controller, a second storage section for storing the factors aborting the control of the master control section and the slave control section, and a display section for displaying the control-abort factors stored in the second storage section.

According to the present invention, there is a control apparatus comprising one or more slave controllers each for performing a specific control to the corresponding processing unit in a processing system, a master controller that supervises the slave controllers, and a bus that connects the slave controllers to the master controller, wherein the slave controllers each include holding means for temporarily holding the abort factor when the control of the slave controllers has been ended because of an abnormal factor, and the master control section includes first storage means for storing the contents of the control of the master controller and the slave controllers, reading means for reading the held abort factor when the abort factor has been held in the holding means at the start-up of the processing system, second storage means that stores the factors aborting the control of the master control section and the abort factor read by the reading means, and display means for displaying the control-abort factors stored in the second storage section.

With the present invention, because the factors aborting the control of the master control unit and the slave control units are stored and then displayed, the abnormal factors can be narrowed down from the stored contents of the control on the basis of the displayed abort factors. The narrowing down of the abnormal factors can be done by just storing the control-abort factors so the storage capacity need not be increased so much.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
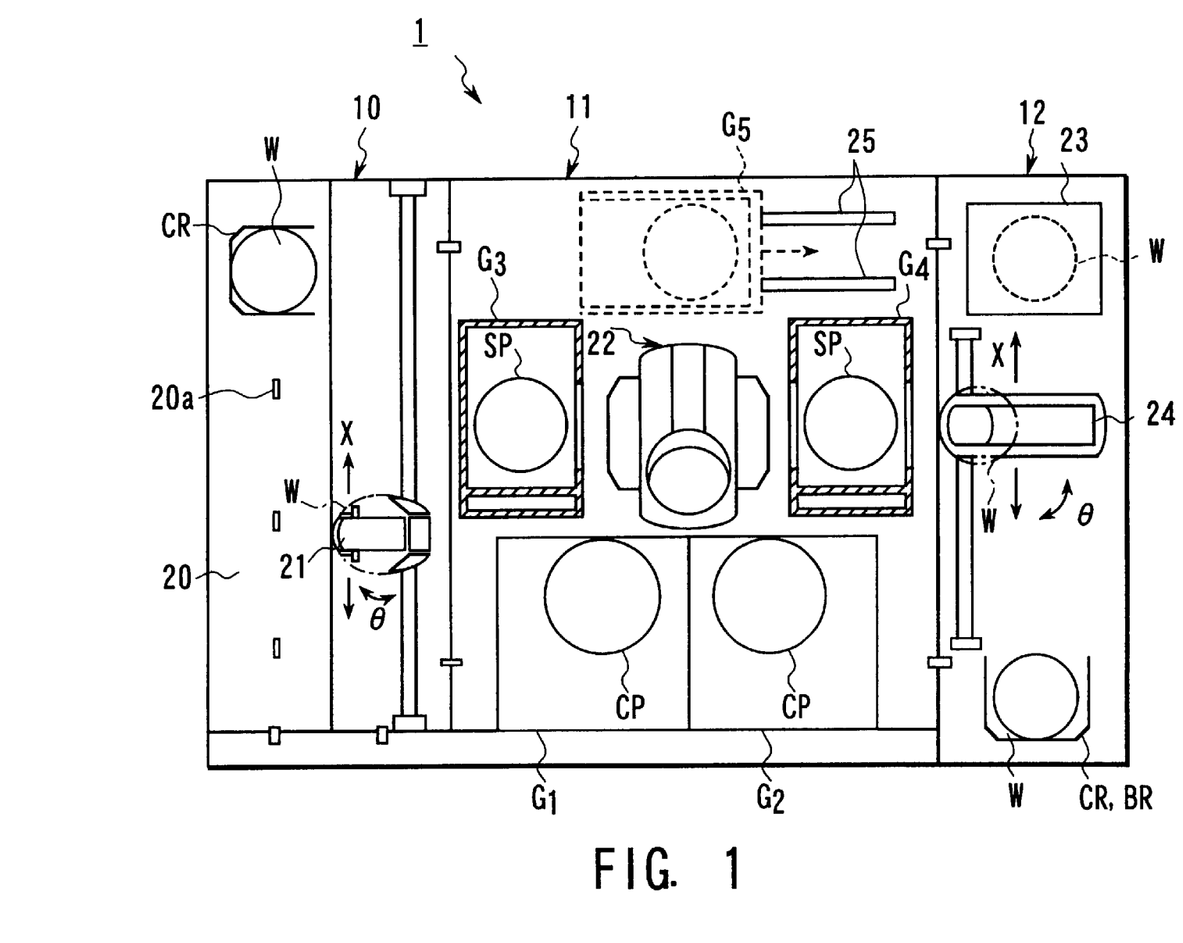
FIG. 1 is a plan view of the overall configuration of a semiconductor wafer coating and developing system to which an embodiment of the present invention has been applied.
Figure 2:
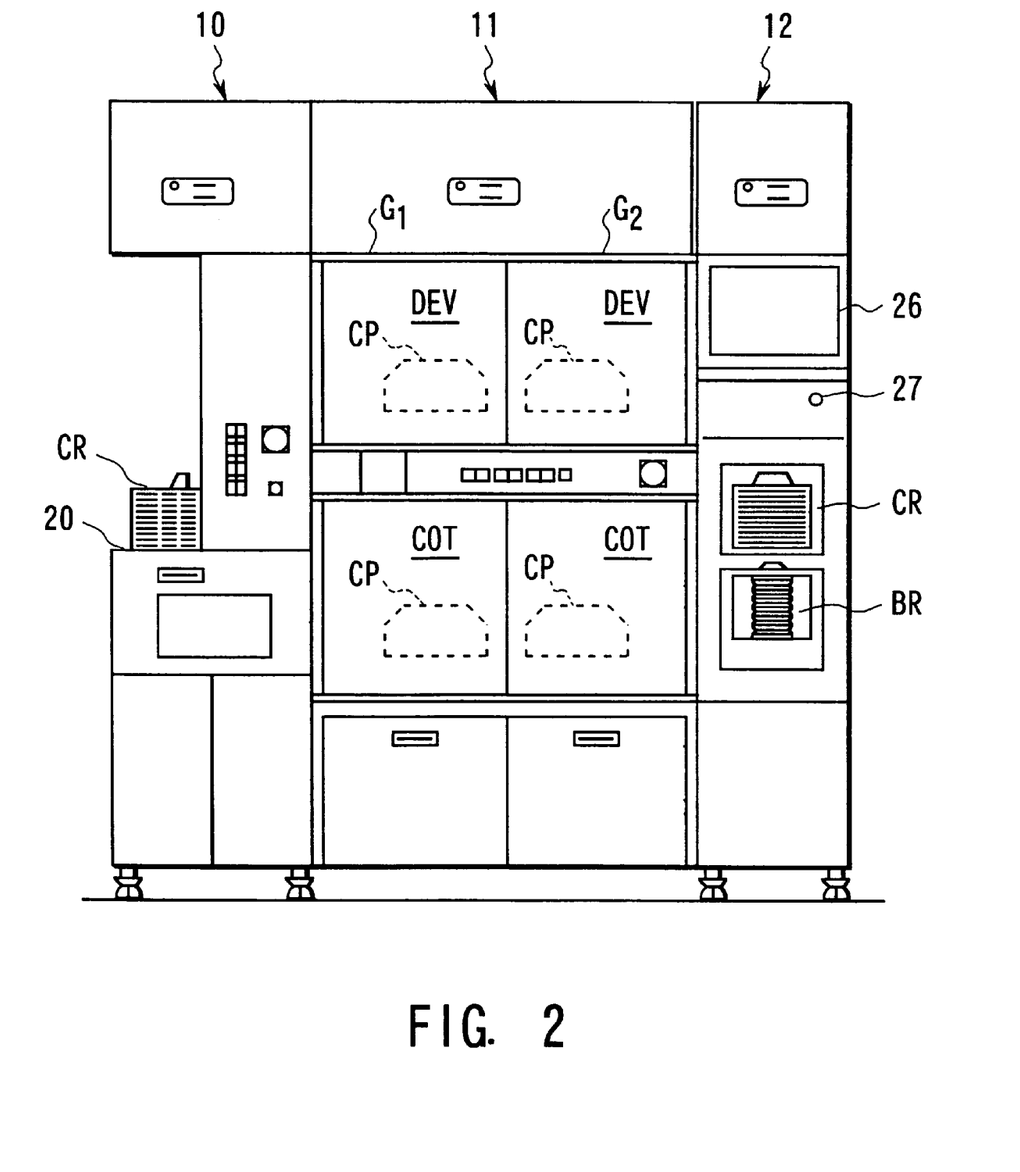
FIG. 2 is a front view of the coating and developing system of FIG. 1.
Figure 3:
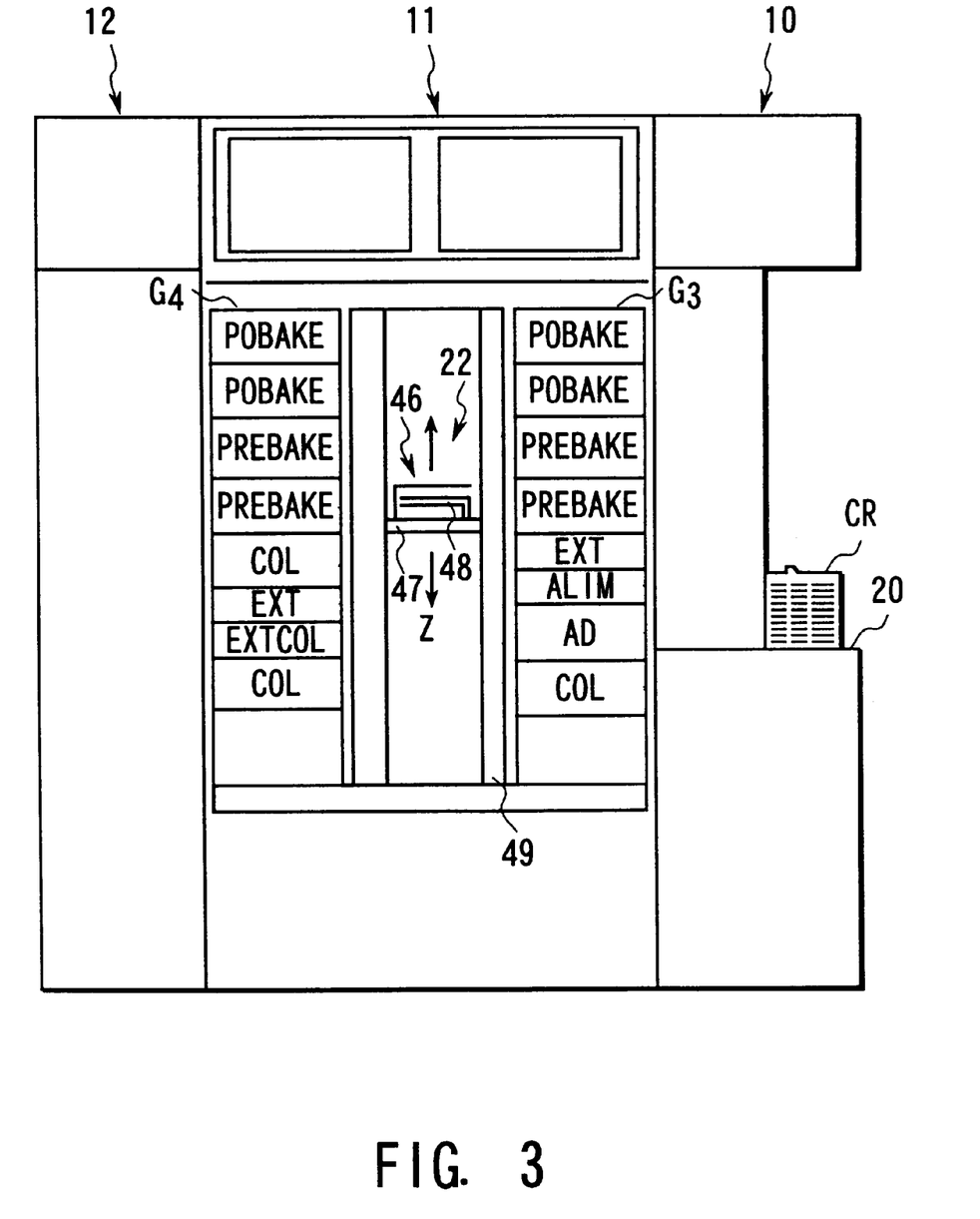
FIG. 3 is a rear view of the coating and developing system of FIG. 1.

Hereinafter, referring to the accompanying drawings, an embodiment of the present invention will be explained. FIGS. 1 to 3 each show the overall configuration of a coating and developing system 1 for semiconductor wafers (hereinafter, referred to as wafers) to which an embodiment of the present invention has been applied. FIGS. 1, 2, and 3 are a plan view, a front view, and a rear view of the coating and developing system 1.

The coating and developing system 1 comprises a cassette station 10, a processing station 11, and an interface section 12. The cassette station 10 loads a plurality of wafers W, substrates to be processed, in a wafer cassettes CR (e.g., in units of 25 wafers) into the system or unloads them to the outside of the system. The cassette station 10 also loads and unloads wafers W into and from the wafer cassettes CR. The processing station 11 has various sheet processing units arranged in specific positions in a multistage layout. Those sheet processing units each perform a specific process on wafers one by one in the coating and developing processes. The interface section 12 transfers wafers W between the processing station 11 and an exposure device (not shown) provided next to the processing station 11. The coating and developing system 1 has the cassette station 10, processing station 11, and interface section 12 which are integrally connected to one another.

In the cassette station 10, a plurality of wafer cassettes CR (e.g., four cassettes) are placed in a line on locating projections 20a on a cassette table 20 in the direction of X (in the vertical direction in FIG. 1), with the wafer inlet and outlet of each wafer cassette facing the processing station 11 as shown in FIG. 1. A wafer carriage 21 can move in the direction of cassette arrangement (i.e., in the direction of X) and in the direction in which the wafers are arranged in the wafer cassette CR (i.e., in the direction of Z). The wafer carriage 21 can selectively access one of the cassettes CR.

The wafer carriage 21 can rotate in the direction of θ. The carriage is also able to access an alignment unit (ALIM) and an extension unit (EXT) belonging to the multistage unit section of a third processing unit group G3 on the processing station 11's side, as explained later.

The processing station 11 includes a main wafer transfer machine 22 of the vertical transfer type provided with a wafer transfer unit. Around the main wafer transfer machine, one or more groups of processing units are arranged. Each group is made up of various processing units arranged in a multistage layout.

In the main wafer transfer machine 22, the wafer transfer unit 46 is provided inside a cylindrical support 49 in such a manner the wafer transfer unit can move up and down (in the direction of Z). The cylindrical support 49 is connected to the rotary shaft of a motor (not shown). The rotary driving force of the motor causes the cylindrical support to rotate together with the wafer transfer unit 46 around the rotary shaft. This enables the wafer transfer unit 46 to rotate freely in the direction of θ. The cylindrical support 49 may be connected to another rotary shaft (not shown) rotated by a motor.

The wafer transfer unit 46 includes a plurality of holding members 48 that can move back and forth on a transfer base 47. The wafer transfer unit carry wafers W from one processing unit to another by means of the holding members 48.

In the coating and developing system 1 of the embodiment, five processing unit groups G1, G2, G3, G4, and G5 can be arranged as follows. First and second processing unit groups G1 and G2 are arranged in the front of the system (i.e., in the lower part of FIG. 1). A third processing unit group G3 is arranged adjacent to the cassette station 10. A fourth processing unit group G4 is put adjacent to the interface section 12. A fifth processing unit group G5 is arranged at the back of the system.

As shown in FIG. 2, in the first processing unit group G1, two spinner-type processing units are arranged one on top of the other. They perform specific processes on a wafer W on a spin chuck in a cup CP. For example, they are a resist coating unit (COT) and a developing unit (DEV) laid one on top of the other in that order from the bottom. Similarly, in the second processing unit group G2, two spinner-type processing units, for example, a resist coating unit (COT) and a developing unit (DEV), laid one on top of the other in that order from the bottom. It is desirable that the resist coating unit (COT) should be placed at the lower stage, since the discharging of the resist solution is a difficult problem in terms of structure and maintenance. The resist coating unit (COT), however, may be placed at the upper stage as the need arises.

In the third processing unit group G3, open-type processing units are laid one on top of another in eight stages as shown in FIG. 3. These units perform specific processes on a wafer W on the table SP. For example, in the third processing unit group G3, a cooling unit (COL) for cooling the wafer, an adhesion processing unit (AD) for improving the fixation of resist by subjecting the surface of the wafer to an adhesion process, an alignment unit (ALIM) for aligning the wafer, an extension unit (EXT), two pre-baking units (PREBAKE) for heating the wafer before exposure, and two post-baking units (POBAKE) for heating the wafer after exposure are laid one on top of another in that order from the bottom. Similarly, in the fourth processing unit group G4, open-type processing units are laid one on top of another in eight stages. For example, in the fourth processing unit group G4, a cooling unit (COL), an extension/cooling unit (EXTCOL), an extension unit (EXT), a cooling unit (COL), two pre-baking units (PREBAKE), and two post-baking units (POBAKE) are laid one on top of another in that order from the bottom.

Thermal interference between the units can be reduced by arranging the cooling unit (COL) and the extension/cooling unit (EXTCOL), whose processing temperatures are low, at the lower stages and the pre-baking units (PREBAKE), post-baking units (POBAKE), and adhesion processing unit (AD), whose processing temperatures are high, at the upper stages. A random multistage arrangement may, of course, be used.

The interface section 12 has the same length in the direction of depth (in the direction of X) as that of the processing station 11 but is shorter in the direction of width. In the front of the interface section 12, a portable pickup cassette CR and a fixed buffer cassette BR are laid one on top of the other. At the back of the interface section, a peripheral exposure unit (optical edge bead remover) 23 is provided. In the middle of the back, the wafer carriage 24 is provided. The wafer carriage 24 is designed to move in the direction of X and the directions of Z to access both of the cassettes CR, BR and the peripheral exposure unit 23. The wafer carriage 24 is also designed to rotate in the direction of θ. As a result, the wafer carriage is able to access not only the extension unit (EXT) belonging to the fourth processing unit group G4 on the processing station 11's side but also the wafer delivery table (not shown) on the adjacent exposure unit side.

In the coating and developing system 1, the fifth processing unit group G5 represented by a broken line can be arranged at the back of the main transfer machine 22 as described above. The multistage processing unit in the fifth processing unit group G5 can move sideward along a guide rail 25 when viewed from the main wafer transfer machine 22. Therefore, even when the multistage processing unit in the fifth processing unit group G5 is provided at the back of the main wafer transfer machine 22 as shown in the figure, sliding the fifth processing unit group G5 along the guide rail 25 secures a space at the back of the main wafer transfer machine 22, which facilitates the maintenance of the main wafer transfer machine 22 from behind the system. Instead of sliding linearly along the guide rail 25, the multistage processing unit in the fifth processing unit group G5 may turn outward from the system as shown by dot-dash lines in FIG. 1. The pivotal movement also makes it easy to secure a space for the maintenance of the main wafer transfer machine 22.

In the upper part of the middle stage in the front of the interface section 12, a touch-panel-type display section 26 serving as a man-machine interface connected to a control system explained later and an emergency button 27 are provided. The display section 26 displays, for example, the abort factors, which will be explained later. The display section 26 also enables the operator to enter an instruction to display the abort factors. The operator enters an instruction by touching the display section 26 with a finger. The user may enter an instruction using a keyboard or a mouse.

Figure 4:
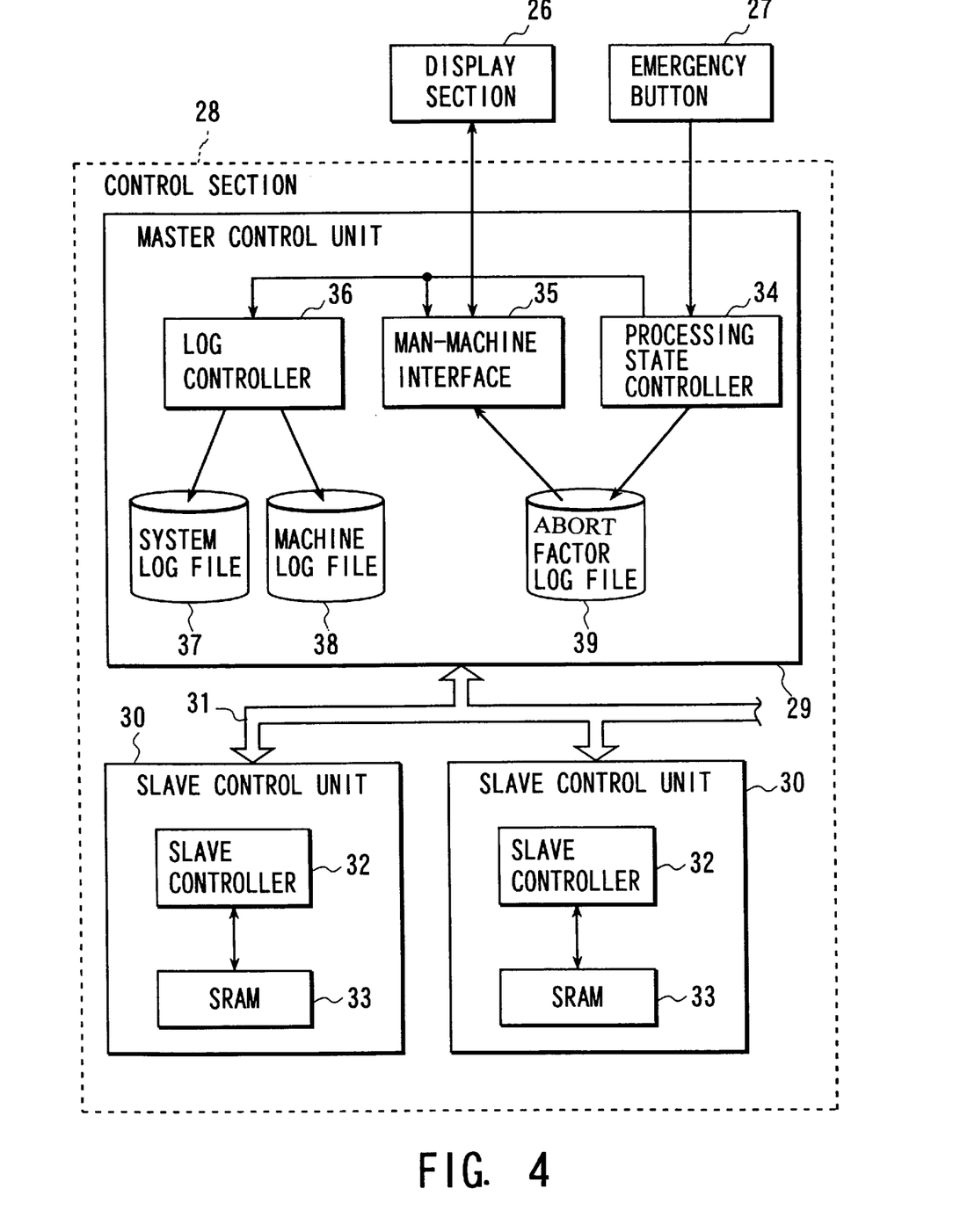
FIG. 4 is a block diagram of the control system of the coating and developing system of FIG. 1.

Next, the control system in the coating and developing system 1 constructed as described above will be explained. FIG. 4 is a block diagram of the control system.

As shown in FIG. 4, in the control system 28, a plurality of slave controllers 30 are connected to a master control unit 29 via a data transfer section, for example, a VME bus 31. The master control unit 29 and slave control unit 30 are operated by respective operation systems (OS), but communicate to each other to control respective units as synchronizing to each other. One slave control unit 30 is provided for each processing unit, for example, a resist coating unit (COT) or a developing unit (DEV). One slave control unit 30 may be provided for each processing unit group or for each set of a specific number of processing units.

Each of the slave controllers 30 includes a slave controller 32 and a holding section, for example, a SRAM 33, that holds the abort factor.

The slave controller 32 controls each section in its own processing unit under the control of the master control unit 29. For example, the slave controller 30 in the resist coating unit (COT) controls the resist coating unit (COT) to make it receive a wafer W from the wafer carriage 21, coat the wafer W with a resist solution, wash the surface of the wafer, and deliver the wafer W to the wafer carriage 21 again. The slave controller 32 performs a series of these mechanical control operations, the control of the amount of the discharged resist solution, the temperature control, and the monitoring of these parameters. The control data (hardware data) for the above control operations in the slave controller 32 are sent as machine data to the master control unit 29 via a VME bus 31. The program scanning data (i.e., the data indicating how the program has run, or the software data) in the slave controller 32 is sent as system data to the master control unit 29 via the VME bus 31.

If a situation has occurred where the whole coating and developing system 1 has to be stopped because of an abnormal factor, the slave controller 32 will send an instruction to make the system 1 abort the operation to the master control unit 29 and cause the SRAM 33 to store the abort factor temporarily.

The SRAM 33 has a memory capacity of, for example, 64 bytes and stores the abort factors for only one session. The SRAM 33 may store the abort factors for more than one session.

The abort factors include, for example, abnormal temperature or the time-out of control. More specifically, for example, if the abort factor is abnormal temperature at the drain, the SRAM 33 will store "abnormal temperature" as the abort factor and "drain" as the place. If the cause of the abort is a disconnection in the VME bus 31, the SRAM 33 will store "bus error" as the abort factor and "bus address" as the place. Particularly, the state that the bus 31 is disconnected to be unable to communicate between the master control unit 29 and the slave control unit 30 and execute the control operation therebetween is an serious abort factor.

When such an abort factor has been stored in the SRAM 33 at the start-up of the system 1, the slave controller 32 reads the data, sends it to the master control unit 29 via the VME bus 31, and deletes the data. When a data to be written next has been produced, the slave controller 32 may overwrite it on the old one.

The master control unit 29 supervises the slave controllers 30 in generalities, and comprises a processing state control section 34 for controlling the processing state in each section, a man-machine interface section 35 for acting as an interface with the display section 26, a log control section 36 for writing log data including machine data and system data, a system log file 37, a machine log file 38, and an abort factor log file 39.

The processing state control section 34 performs the start-up control of each of the slave controllers 30, the display and input control of the display section 26 via the man-machine interface section 35, the input control of the emergency button 27, and the writing of data into the abort factor log file 39. For example, the processing state control section 34 performs the start-up control of each of the slave controllers 30 at the start-up of the system 1. At this time, when being informed of the abort factor by one of the slave controllers 30 via the VME bus 31, the processing state control section 34 writes the abort factor into the abort factor log file 39. When an abort factor has occurred in the master control unit 29, the processing state control section 34 also writes the abort factor into the abort factor log file 39.

The abort factors in the master control unit 29 include a normal factor associated with the normal abort of the system 1 and an abnormal factor associate with the abnormal abort of the system. Whether the abort factor is a normal or abnormal factor is written into the abort factor log file 39. When it is an abnormal factor, its cause is also written in the abort factor log file 39.

The abort factors includes a normal factor indicating that the system completes the operation properly and an abnormal factor indicating that it completes the operation accidentally. The process controller 34 writes data discriminating between the abnormal factor and normal factor and data indicating the cause of the abnormality in case of the abnormal factor into the abort factor log file 39. In other words, the process controller 34 determines whether the normal factor indicating that the system was aborted by an abort instruction from the operator via the panel switch of the display 26 or keyboard or the abnormal factor indicating that the system is interrupted due to machine trouble, and writes the abort factors in the abort factor log file 39.

The reason why the system aborts its operation abnormally is that, for example, an error has occurred due to the time-out at the start-up or that the emergency button 27 has been pressed. In the case of the time-out at the start-up, "time-out" is the cause of the abnormal abort and "process name" is its place. When the emergency button 27 has been pressed, "pressing the emergency button" is the cause of the abnormal abort and "emergency button" is its place.

In the abort factor log file 39, the abort factor in the master control unit 29 and the abort factor sent from each of the slave controllers 30 are written in the order in which, for example, they have occurred. Up to 30 of such abort factors can be written in the abort factor log file 39. If the number of abort factors has exceeded 30, for example, they will be deleted in the order in which they have been stored. The number of abort factors that can be written may be more than or less than 30. The abort factors may be deleted in other ways. For instance, the normal factors may be deleted first or the abort factors from the slave controllers 30 be deleted first.

The man-machine interface section 35 acts as an interface with the display section 26. When receiving an instruction to turn off the system 1 from the display section 26, the man-machine interface section 35 transfers the instruction to the master control unit 29. When reading the data from the abort factor log file 39 at the start-up of the system 1 and finding that an abnormal abort factor has been recorded, the man-machine interface section 35 displays it on the display section 26. Moreover, when receiving from the display section 26 (e.g., by operation of the panel switch or selection of the display menu) an instruction to read the data from the abort factor log file 39, the man-machine interface section 35 reads the data from the abort factor log file 39 and displays the data on the display section 26.

The log control section 36 writes the system data on the master control unit 29 and the slave controllers 30 into the system log file 37 and the machine data on the master control unit 29 and the slave controllers 30 into the machine log file 38.

Next, the operation of the control system constructed as described above will be explained.

Figure 5:
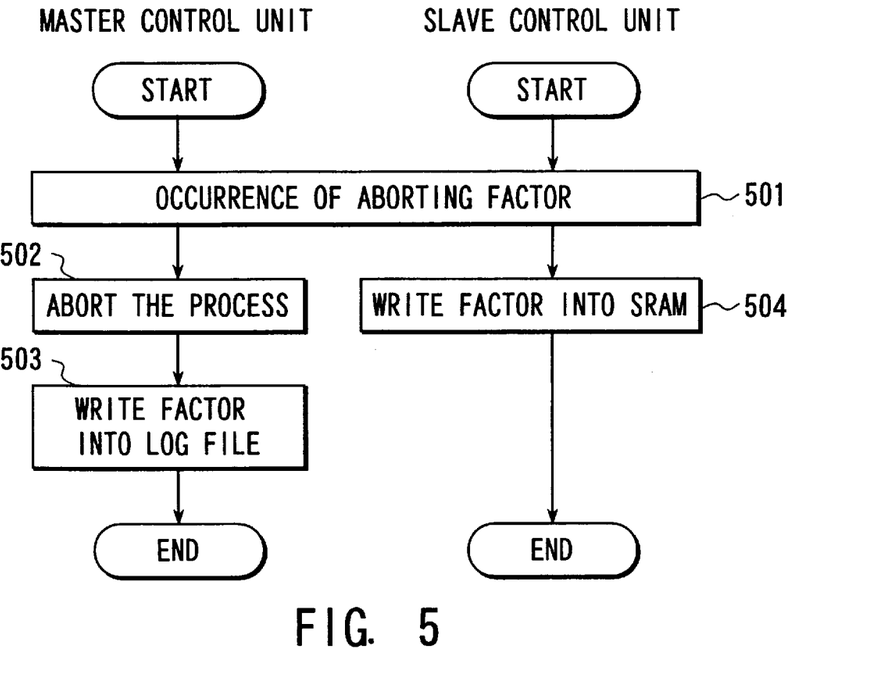
FIG. 5 is a flowchart for the operation of the master control unit and each of the slave control units when the coating and developing system of FIG. 1 has completed the operation.

FIG. 5 is a flowchart for the operation of the master control unit 29 and each of the slave controllers 30 when the system has ended the operation.

When an abort factor has occurred in either the master control unit 29 or one of the slave controllers 30 (step 501), the master control unit 29 performs the process of aborting the operation of the whole system (step 502). When the abort factor has been found in the master control unit 29, the master control unit 29 writes the abort factor into the abort factor log file 39 (step 503). When an abort factor has occurred (step 501) and the abort factor has been found in one of the slave controllers 30, the slave control unit 30 writes the abort factor into the SRAM 33 (step 504).

Figure 6:
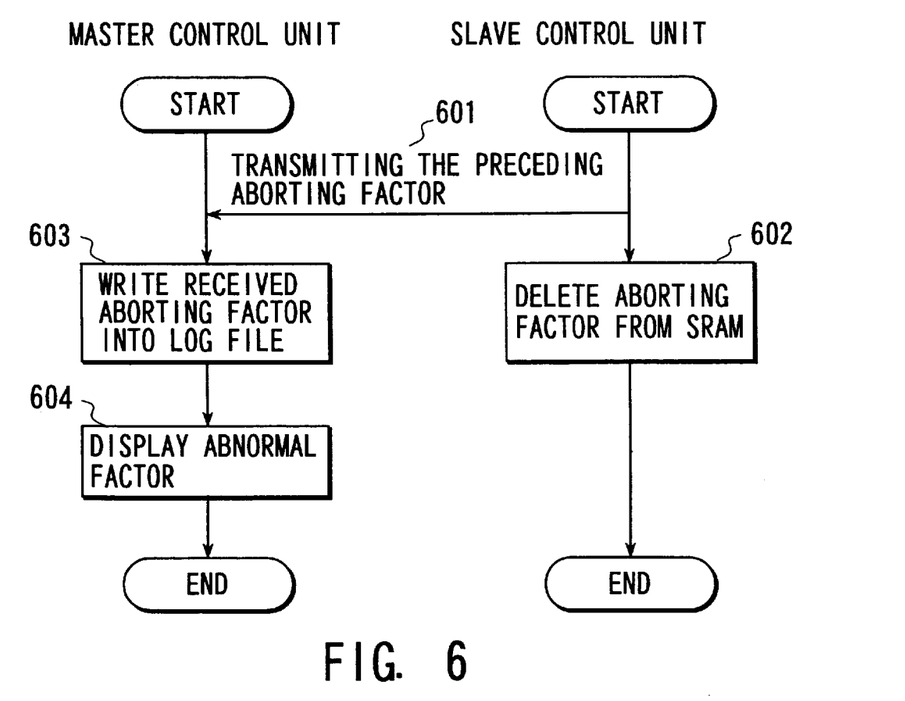
FIG. 6 is a flowchart for the operation of the master control unit and each of the slave control units at the startup of the coating and developing system of FIG. 1.

FIG. 6 is a flowchart for the operation of the master control unit 29 and each of the slave controllers 30 at the start-up of the system.

After the start-up of the system, when an abort factor has been written in the SRAM 33 of each of the slave controllers 30, the abort factors are sent to the master controller 30 (step 601). Thereafter, each slave control unit 30 deletes the abort factor from the SRAM 33 (step 602). The master control unit 29 writes the abort factors transmitted from the slave controllers 30 into the abort factor log file 39 (step 603). At that time, when more than 30 data have been written in the abort factor log file 39, the oldest abort factor is deleted first. Thereafter, when an abnormal abort factor has been written in the abort factor log file 39, the data is displayed on the display section 26 (step 604).

With the system 1, the abort factors stored in the abort factor log file 39 can be displayed on the display section 26 not only at the start-up of the system but also at any time after the start-up.

Figure 7:
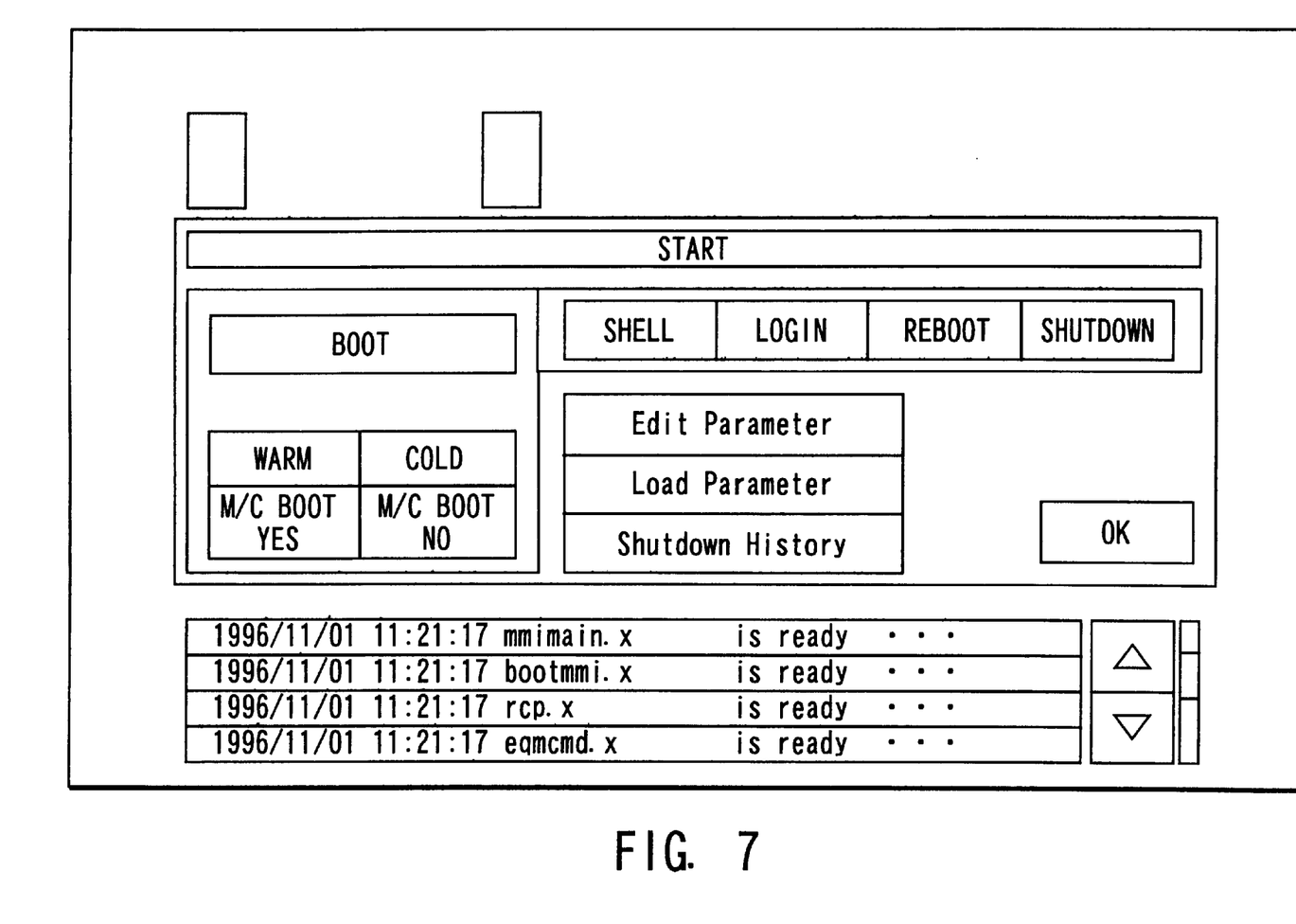
FIG. 7 shows a screen on which an instruction to display the abort factors is to be entered in the display section of the coating and developing system of FIG. 1.
Figure 8:
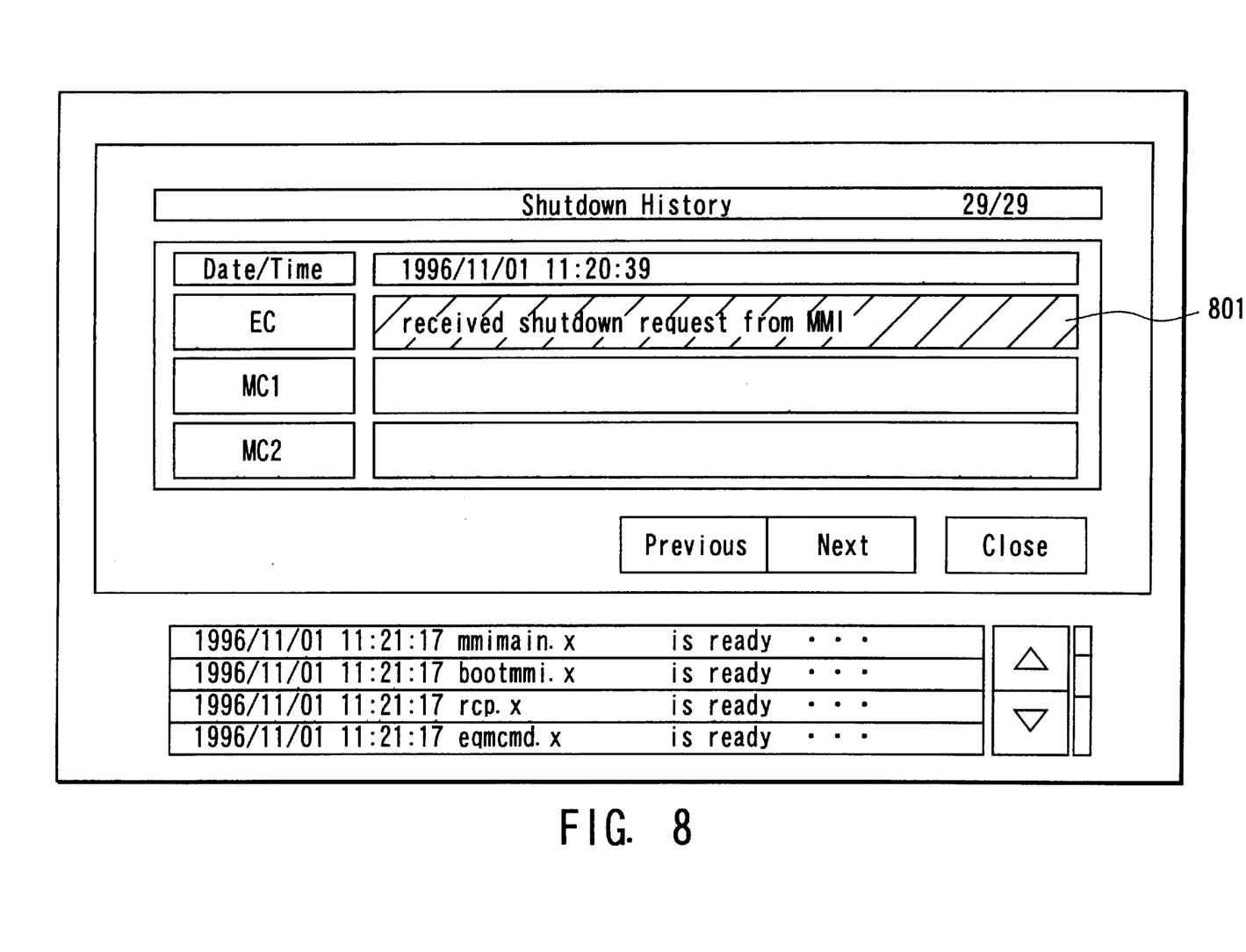
FIG. 8 shows a screen in the display section of the coating and developing system of FIG. 1 when the abort factor is a normal factor.
Figure 9:
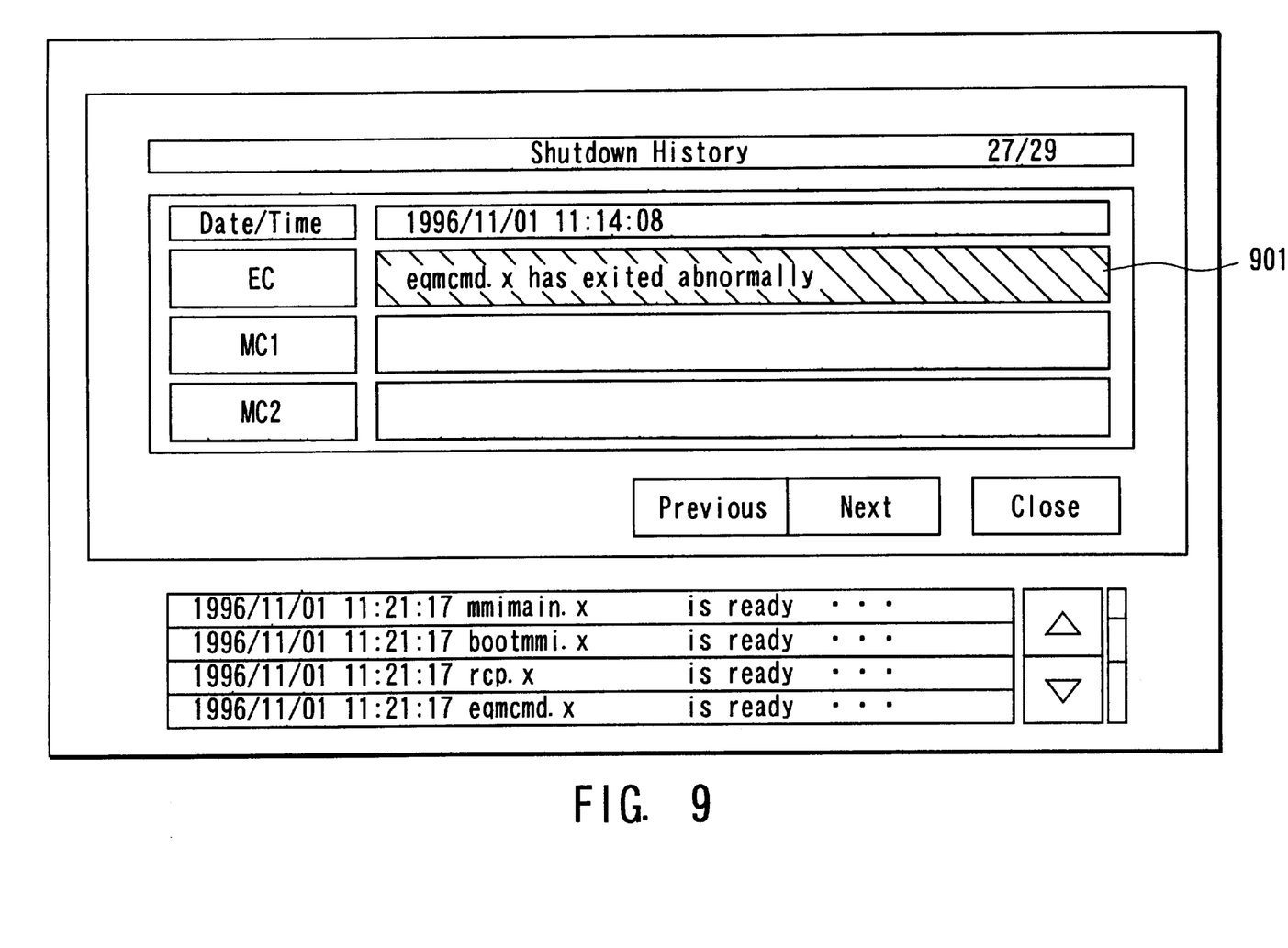
FIG. 9 shows a screen in the display section of the coating and developing system of FIG. 1 when the abort factor is an abnormal factor.

FIG. 7 shows a screen used to enter an instruction for displaying the abort factors on the display section 26. In FIG. 7, pressing "Shutdown History" button and then "OK" button causes the abort factors stored in the abort factor log file 39 to be displayed on the screen. FIGS. 8 and 9 are abort factor screens. Pressing "Previous" button causes the abort factor immediately before the currently displayed one to be displayed. Pressing "Next" button causes the abort factor immediately after the currently displayed one to be displayed. FIG. 8 shows a screen appearing when the abort factor is a normal factor. Numeral 801 indicates the description of the abort factor. FIG. 9 shows a screen appearing when the abort factor is an abnormal factor (on the master controller side). Numeral 901 indicates the description of the abort factor. When the abort factor is an abnormal factor, changing the description of the abort factor 901 shown in FIG. 9 from the normally black to a more distinctive color, such as red or yellow, makes it easier to determine whether the abort factor is a normal or abnormal factor. The abnormal factor 901 may be blinked. Moreover, the color of the ground of the field for the abort factor 901 may be changed.

As described above, with the system 1 of the embodiment, because the abnormal factors that caused the system to abort the operation up to that time are displayed on the display section 26 at the start-up of the system 1, it is possible to inform, for example, a service center of the occurrence of an abnormality and its cause. This enables a quick and suitable recovery of the system.

Because the abort factors stored in the abort factor log file 39 can be displayed on the display section 26 at any time after the start-up, the cause of the abnormality can be investigated quickly and accurately. It takes a lot of time and labor to find an abnormal factor from the data in the system log file 37 and machine log file 38, because the amount of those data is enormous. To overcome the problem, the abnormal factors are narrowed down to some extent using the abort factors stored in the abort factor log file 39. Thereafter, checking the system log file 37 and machine log file 38 for the relevant data makes it possible to investigate the cause of the abnormality quickly and accurately.

At the start-up of the system 1, not only the abnormal factors that caused the system to abort the operation up to that time but also the question whether to back up the system data and machine data or not may be displayed on the display section 26. When the backup instruction is entered, these data may be stored as backup data independently of the system data and machine data. Backing up the data prevents the log data used to analyze the cause of the abnormality in the system from being lost, while in the embodiment, the data in the system log file 37 and machine log file 38 are deleted in the order in which they have been stored.

When the abnormal factors that caused the system to abort the operation up to that time are present at the start-up of the system 1, the abnormal factors may be transmitted automatically through a communication channel to a service center.

The control apparatus of the present invention is not restricted to the semiconductor wafer coating and developing system. For instance, it may be applied to processing systems for LCDs, glass substrates, CD substrates, photomasks, printed-circuit boards, or ceramic substrates, and to a variety of systems in other fields.

As described in detail, the control apparatus according to the present invention includes one or more slave controllers that perform specific control and a master controller that supervises the slave controllers. The master controller includes a first storage section that stores the contents of the control of the master controller and slave controllers, a second storage section that stores the factors aborting the control of the master controller and slave controllers, and a display section that displays the control-abort factors stored in the second storage section. With this configuration, the control apparatus can narrow down the abnormal factors without increasing the memory capacity so much.

According to the present invention one or more slave controllers for performing specific control and a master controller for supervising the slave controllers are provided. The slave controllers each has a holding section that temporarily holds the abort factor when the control of the slave controller has been terminated because of an abnormal factor. The master controller includes a first storage section that stores the contents of the control of the master controller and slave controllers, a reading section that reads the stored abort factors when the abort factors have been stored in the holding section at the start-up of the apparatus, a second storage section for storing the factors aborting the control of the master control unit and the abort factors read by the reading section, and a display section that displays the control-abort factors stored in the second storage section. With this configuration, the control apparatus of the present invention can let the operator know the abnormal factor no matter where it has occurred.

Furthermore, the function of determining whether the abort factor is a normal or abnormal factor and the cause of the abort factor when it is an abnormal factor is further added to the above configuration. This makes it possible to investigate the cause of the abnormal factor more exactly. Additionally, if the display section is designed to display the abort factors at the start-up of the apparatus when the abnormal abort factors have been stored in the second storage device, the control apparatus will be able to inform the operator that the apparatus has terminated the operation because of an abnormal factor. If an input section that enables the operator to enter an instruction to display the abort factors and the display section is designed to display the control-abort factors stored in the second storage section when the display instruction has entered from the input section, the operator will be able to see the abort factors at any time.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

What is claimed is:

1. A control apparatus comprising at least one slave control unit for subjecting a processing unit corresponding to said slave control unit in a processing system to a specific control;
   a master control unit for supervising said slave control unit; and
   a bus for connecting said slave control unit to said master control unit, wherein said master control unit includes
   a first storage section for storing the contents of the control of said master control unit and said slave control unit,
   a second storage section for storing the factors aborting the control of said master control unit and said slave control unit and
   a display section for displaying the control-abort factors stored in said second storage section, and
   said first storage section includes a system log file for storing system data of said master control unit and said slave control unit and a machine log file for storing machine data of said master control unit and said slave control unit, and a log control section controls the writing of data into said system log file and said machine log file.

2. A control apparatus according to claim 1, further comprising a plurality of slave control units provided for a plurality of processing units in a semiconductor device manufacturing apparatus, respectively, and controlled by said master control unit.

3. A control apparatus according to claim 1, wherein said slave control unit includes a slave controller for controlling said processing unit in connection with said master control unit and a storage section that stores data including the abort factors bringing said processing unit into an abort state, said slave controller transferring the data stored in said storage section to said master control unit via said bus.

4. A control apparatus according to claim 3, wherein said slave controller deletes the data in said storage section after transferring the data.

5. A control apparatus according to claim 1, wherein said master control unit includes a man-machine interface section that serves as an interface with said display section, a log control section for writing log data including machine data and system data, and a processing control section that controls said man-machine interface section and said log control section and communicates with said slave control unit via said bus.

6. A control apparatus according to claim 5, wherein said processing control section determines whether the abort factor is a normal or abnormal factor and the cause of the abort factor when it is an abnormal factor, and writes data regarding determination into said second storage section.

7. A control apparatus according to claim 6, wherein said processing control section determines whether the abort factor is a normal factor for causing said processing system to abort its operation when the operator has entered an abort instruction or an abnormal factor for causing said processing system to abort its operation when the system has malfunctioned and writes the abort factors into said second storage section.

8. A control apparatus according to claim 7, wherein said processing control section writes the abort factors occurred in said master controller and the abort factors sent from said slave control unit sequentially into said second storage section and, when the amount of the entered abort factors has exceeded the capacity of the second storage section, deletes the abort factors in the order in which they have been stored.

9. A control apparatus comprising:
at least one slave control unit for subjecting a processing unit corresponding to said slave control unit in a processing system to a specific control;
a master control unit for supervising said slave control unit; and
a bus that connects said slave control unit to said master controller, wherein
said slave control unit includes
a holding device configured to temporarily hold an abort factor when the control of said slave control unit has been aborted because of an abnormal factor, and
said master control unit includes
a first storage device configured to store the contents of the control of said master control unit and said slave control unit,
a reading device configured to read the held abort factor when the abort factor has been held in said holding device at the start-up of said processing system,
a second storage device configured to store the factors aborting the control of said master control unit and the abort factor read by said reading device, and
a display configured to display the control-abort factors stored in said second storage device and
said first storage device includes a system log file that stores system data on said master control unit and said slave control unit, and a machine log file that stores machine data on said master control unit and said slave control unit, and said log control section that controls writing of data into said system log file and said machine log file.

10. A control apparatus according to claim 9, wherein said master control unit determines whether said abort factor is a normal or abnormal factor and the cause of the abort factor when it is an abnormal factor.

11. A control apparatus according to claim 10, wherein said display the abort factor at the start-up of said system when the abnormal abort factor has been stored in said second storage device.

12. A control apparatus according to claim 9, further comprising an input device configured to input an instruction to display said abort factor, wherein said display displays the control-abort factor stored in said second storage device when a display instruction has been inputted from said input device.

13. A control apparatus according to claim 9, further comprising a plurality of slave control units provided for a plurality of processing units in a semiconductor device manufacturing apparatus, respectively, and controlled by said master controller.

14. A control apparatus according to claim 9, wherein said slave control units each include a slave controller for controlling a corresponding one of said processing units in connection with said master control unit and stores in said holding device data including the abort factor bringing the corresponding one of said processing units into an abort state, said slave controller transferring the data stored in said holding device to said master controller via said bus.

15. A control apparatus according to claim 14, wherein said slave controller deletes the data in said storage means after transferring the data.

16. A control apparatus according to claim 9, wherein said master control unit includes a man-machine interface section configured to serve as an interface with said display, a log control section that writes log data on the machine data and the system data into said first storage device, and a processing control section for controlling said man-machine interface section and said log control section and communicating with said slave control units via said bus.

17. A control apparatus according to claim 16, wherein said processing control section determines whether the abort factor is a normal factor indicating that said processing system is aborted its operation by an abort instruction entered by an operator or an abnormal factor indicating that said processing system is aborted its operation by a machine trouble, and writes the abort factor in said second storage device.

18. A control apparatus according to claim 16, wherein said processing control section writes the abort factor occurred in said master control unit and the abort factor sent from at least one of said slave control units sequentially into said second storage device and, when the amount of the stored abort factors has exceeded the capacity of the second storage device, deletes the abort factors in the order in which they have been stored.

19. A semiconductor manufacturing apparatus comprising:
a plurality of processing units subjecting a semiconductor wafer to various processes;
at least one slave control unit which subjects at least one of said processing units, that corresponds to said slave controller, to a specific control;
a master control unit which supervises said slave control unit; and
a bus which connects said slave control unit to said master control unit, wherein said master control unit includes
a first storage section for storing the contents of the control of said master control unit and said slave control unit,
a second storage section configured to store a plurality of factors aborting the control of said master control unit and said slave control unit, the factors indicating a normal stop, an abnormal temperature, control timeouts, bus errors and communications inability, respectively, and
a display configured to display the control-abort factors stored in said second storage section.

20. A semiconductor manufacturing apparatus according to claim 19, further comprising a plurality of slave units provided for a plurality of processing units in a semiconductor device manufacturing apparatus, respectively, and controlled by said master control unit.

21. A semiconductor manufacturing apparatus according to claim 19, wherein said slave control unit includes a slave controller for controlling said processing unit in connection with said master control unit and a storage section that stores data including the abort factors bringing said processing unit into an abort state, said slave controller transferring the data stored in said storage section to said master control unit via said bus.

22. A semiconductor manufacturing apparatus according to claim 21, wherein said slave controller deletes the data in said storage section after transferring the data.

23. A semiconductor manufacturing apparatus according to claim 19, wherein said master control unit includes a man-machine interface section that serves as an interface with said display, a log control section configured to write log data including machine data and system data, and a processing control section that controls said man-machine interface section and said log control section and communicates with said slave control unit via said bus.

24. A semiconductor manufacturing apparatus according to claim 23, wherein said processing control section is configured to determine whether the abort factor is a normal or abnormal factor and the cause of the abort factor when it is an abnormal factor, and to write data regarding such a determination into said second storage section.

25. A semiconductor manufacturing apparatus according to claim 24, wherein said processing control section is configured to determine whether the abort factor is a normal factor to cause said processing unit to abort its operation when the operator has entered an abort instruction or an abnormal factor to cause said processing unit to abort its operation when the system has malfunctioned and to write the abort factors into said second storage section.

26. A semiconductor manufacturing apparatus according to claim 25, wherein said processing control section is configured to write the abort factors occurred in said master control unit and the abort factors sent from said slave control unit sequentially into said second storage section, and when an amount of the entered abort factors has exceeded the capacity of the second storage section, to delete the abort factors in the order in which they have been stored.

27. A semiconductor manufacturing apparatus according to claim 23, wherein said first storage section includes a system log file configured to store the system data of said master control unit and said slave control unit and a machine log file configured to store the machine data of said master control unit and said slave control unit, and a log control section which controls the writing of data into said system log file and said machine log file.

* * * * *